US009119205B2

(12) United States Patent
Wang et al.

(10) Patent No.: US 9,119,205 B2
(45) Date of Patent: Aug. 25, 2015

(54) METHOD, DEVICE AND SYSTEM FOR IMPLEMENTING FREQUENCY POINT SWITCH BASED ON CR

(75) Inventors: Libo Wang, Beijing (CN); Jinling Hu, Beijing (CN); Guojun Xiao, Beijing (CN); Yu Yang, Beijing (CN); Wenling Bai, Beijing (CN); Xueming Pan, Beijing (CN); Qiubin Gao, Beijing (CN); Chenggang Jiang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 152 days.

(21) Appl. No.: 13/701,806

(22) PCT Filed: Sep. 28, 2011

(86) PCT No.: PCT/CN2011/080282
§ 371 (c)(1),
(2), (4) Date: Feb. 12, 2013

(87) PCT Pub. No.: WO2012/048618
PCT Pub. Date: Apr. 19, 2012

(65) Prior Publication Data
US 2013/0190028 A1    Jul. 25, 2013

(30) Foreign Application Priority Data
Oct. 15, 2010    (CN) .......................... 2010 1 0517209

(51) Int. Cl.
*H04W 72/04* (2009.01)
*H04W 36/06* (2009.01)
(Continued)

(52) U.S. Cl.
CPC .......... *H04W 72/0453* (2013.01); *H04W 16/14* (2013.01); *H04W 36/06* (2013.01); *H04W 48/08* (2013.01); *H04W 88/08* (2013.01)

(58) Field of Classification Search
CPC ..... H04W 16/14; H04W 16/02; H04W 16/16; H04W 48/00; H04W 48/18; H04W 48/20; H04W 36/06; H04W 48/08; H04W 72/0453; H04W 88/08

USPC ............. 455/509, 501, 179.1, 188.1, 70, 450, 455/41.2; 370/310, 360, 375, 338, 252, 350
See application file for complete search history.

(56) References Cited

U.S. PATENT DOCUMENTS 8,391,170 B2 *   3/2013   Yamaguchi et al. .......... 370/252
2007/0042733 A1 *   2/2007   Tomioka .................... 455/179.1
(Continued)

FOREIGN PATENT DOCUMENTS

CN        101277516 A        10/2008
CN        101361293 A         2/2009
(Continued)

OTHER PUBLICATIONS

International Search Report in PCT/CN2011/080282 mailed Jan. 5, 2012.

*Primary Examiner* — Tan Trinh
(74) *Attorney, Agent, or Firm* — Marshall, Gerstein & Borun LLP

(57) ABSTRACT

The present application relates to of the communication field and discloses a method, device and system for implementing frequency point switch based on CR. The method comprises: determining, by a cognitive base station, a candidate working frequency point for UE deployed in a cognitive frequency band; then sending to the UE broadcast information which at least carries the candidate working frequency point and instructing the UE to switch from the working frequency point currently used thereby to the candidate working frequency point by way of a frequency point switching command. In this way, the UE deployed in the cognitive frequency band can achieve frequency point switch quickly and accurately according to the instruction from the cognitive base station when an incumbent user accesses the working frequency point currently used by the UE, effectively avoiding interference to the incumbent user and thereby ensuring the service performance and service continuity of the system. The present application also discloses a corresponding device and system.

17 Claims, 5 Drawing Sheets

(51) Int. Cl.
*H04W 16/14* (2009.01)
*H04W 48/08* (2009.01)
*H04W 88/08* (2009.01)

(56) References Cited

U.S. PATENT DOCUMENTS

| | | |
|---|---|---|
| 2009/0067354 A1* | 3/2009 | Gao et al. .................. 370/310 |
| 2009/0111388 A1* | 4/2009 | Chen .............................. 455/70 |
| 2009/0207800 A1 | 8/2009 | Shan et al. |
| 2010/0027517 A1* | 2/2010 | Bonta et al. ................. 370/338 |
| 2010/0093360 A1* | 4/2010 | Choi et al. ................... 455/450 |
| 2010/0135226 A1 | 6/2010 | Chandramouli et al. |
| 2010/0165864 A1* | 7/2010 | Yamaguchi et al. ......... 370/252 |
| 2013/0029706 A1* | 1/2013 | Sachs et al. .................. 455/501 |

FOREIGN PATENT DOCUMENTS

| | | | |
|---|---|---|---|
| WO | WO-2009/072087 A1 | 6/2009 | |
| WO | WO 2009/078606 * | 6/2009 | ............ H04B 7/155 |
| WO | WO-2009/078606 A1 | 6/2009 | |

* cited by examiner

METHOD, DEVICE AND SYSTEM FOR IMPLEMENTING FREQUENCY POINT SWITCH BASED ON CR

This application is a US National Stage of International Application No. PCT/CN2011/080282, filed 28 Sep. 2012, designating the United States, and claiming the benefit of Chinese Patent Application No. 201010517209.7, filed with the Chinese Patent Office on Oct. 15, 2011 and entitled "Method, apparatus and system for implementing frequency point switch based on CR", which is hereby incorporated by reference in its entirety.

FIELD OF THE INVENTION

The present invention relates to the field of cognitive radio spectrums and particularly to a method, apparatus and system for implementing frequency point switch based on CR.

BACKGROUND OF THE INVENTION

Radio spectrum resources as a kind of valuable natural resources are definite and limited. There is an increasingly conspicuous contradiction between an increasing demand for broadband radio communication and the limited radio spectrum resources along with the development of radio communication technologies. At present the utilization ratio of the spectrum resources can be improved to some extent thanks to the improvement of the technologies, but the demand of system for the spectrum resources still can not be meet. From the perspective of a characteristic of signal propagation, the spectrum resources in lower frequency bands are incomparably superior to those in higher frequency bands. Among the existing spectrum resources, the superior spectrum resources (e.g., the radio communication spectrum resources in the lower frequency bands) have been extensively allocated, thus resulting in very limited spectrum resources that remain; and there is a very low utilization ratio of the allocated spectrum resources, and many of those spectrum resources already allocated to existing radio systems are idle temporally and spatially to some varying extent primarily as a result of the existing spectrum administration and allocation policies where the spectrum resources are allocated in a relatively fixed pattern failing to adapt rapidly to a demand.

In view of this issue, people pay increasing attention to the technologies of Cognitive Radio (CR). The technologies of CR refers to that a cognitive user accesses an incumbent user (i.e. authorized user) frequency band or an CR user (i.e., secondary user or unauthorized user) frequency band opportunistically without posing harmful interference to an incumbent user (i.e., authorized user) or another CR user (i.e., secondary user or unauthorized user) of a spectrum resource, or that a plurality of systems can share a spectrum through a common pool of resources to improve the utilization ratio of the spectrum. The emergence of the technologies of a cognitive radio offer a powerful technical support of addressing the insufficiency of the spectrum resources, performing dynamic management of the spectrums and improving the utilization ratio of the spectrums, The various of CR technologies have two fundamental features: a cognitive ability and a reconfiguration ability, where the cognitive ability enables CR to capture or perceive information on the use of a relevant spectrum from its operating radio environment to thereby identify a spectrum gap in a specific time domain, frequency domain and space domain and to select an optimum operating frequency band and optimum operating parameters. This process involves three primary steps of spectrum perception, spectrum analysis and spectrum decision. The reconfiguration ability enables a cognitive device to be programmed dynamically in response to a radio environment to thereby allow the cognitive device to transmit data with a variety of radio transmission technologies. Reconfigurable parameters include an operating frequency, a modulation scheme, transmission power, underlying and upper communication protocols, etc.

Taking a blank TV frequency band as an example, an unauthorized radio device can detect a signal of an authorized system below a threshold through an antenna and a receiver using the CR technologies to thereby decide whether a TV channel is being used. Higher The sensitivity required for spectrum perception is typically higher than that required for a receiver of an authorized service. The spectrum perception function is to examine every frequency band and find those available frequency bands (i.e., spectrum gaps) with the strength of a detected signal below a threshold. Unlike a general receiver, it is only necessary for spectrum perception to judge whether there is a signal present in a specific frequency band without decoding the received signal.

In view of the foregoing introduction of the prior art, the broadcast frequency band with a low utilization ratio can have an idle spectrum used for a mobile communication system to thereby improve the efficiency and coverage of the mobile communication system if the mobile communication system share the 700 MHz frequency band with a broadcast system with the CR technologies. However in order to ensure no influence on normal operation of the broadcast system, a technology compatible with an existing system and provided with a cognitive function has to be designed to thereby perform the CR function in the mobile communication system using the spectrum perception and spectrum obviation technologies.

However an existing mobile communication system, e.g., a Long Term Evolution (LTE) system, is designed for a pre-deployed stable authorized frequency band without taking into account various demands when an operating frequency band of the system is a cognitive, instable and unauthorized frequency band. Thus no appropriate solution has been designed for such a scenario that when the mobile communication system is deployed at a cognitive frequency band (unauthorized frequency band), it shall be ensured, as needed, as much as possible that no influence will be posed on communication of an incumbent user, where the mobile communication system shall quit rapidly the cognitive frequency band and select a new frequency band for establishing a cell upon detection of the occurring of an incumbent user, and in this process, the user shall be further handed over to the newly established cell to thereby ensure service continuity of the user. Thus the performance indexes required for the CR technologies can not be accommodated if the mobile communication system and the user equipment deployed in the cognitive frequency band operate purely as in the existing design solution.

SUMMARY OF THE INVENTION

Embodiments of the invention provide a method, apparatus and system for implementing frequency point switch based on CR so as to avoid interference of a user equipment to an incumbent user in a cognitive frequency band when a mobile communication system is deployed in the cognitive frequency band.

Specific technical solutions according to the embodiments of the invention are as follows:

A method for implementing frequency point switch based on CR includes:

determining, by a cognitive base station, a candidate operating frequency point for a UE deployed in a cognitive frequency band; and transmitting, by the cognitive base station, broadcast information carrying at least the candidate operating frequency point to the UE and instructing the UE in a frequency point switching command to switch from a currently used operating frequency point to the candidate operating frequency point.

A method for implementing frequency point switch based on CR includes:

receiving, by a UE deployed in a cognitive frequency band, broadcast information, transmitted from a cognitive base station, carrying at least a candidate operating frequency point; and switching, by the UE, from a currently used operating frequency point to the candidate operating frequency point upon reception of a frequency point switching command transmitted from the cognitive base station.

An apparatus for implementing frequency point switch based on CR includes:

a determining unit configured to determine a candidate operating frequency point for a UE deployed in the cognitive frequency band; and a communicating unit configured to transmit broadcast information carrying at least the candidate operating frequency point to the UE and to instruct the UE in a frequency point switching command to switch from a currently used operating frequency point to the candidate operating frequency point.

An apparatus for implementing frequency point switch based on CR includes:

a communicating unit configured to receive, in a cognitive frequency band, broadcast information, transmitted from a cognitive base station, carrying at least a candidate operating frequency point; and a switching unit configured to switch from a currently used operating frequency point to the candidate operating frequency point upon reception of a frequency point switching command transmitted from the cognitive base station.

A system for implementing frequency point switch based on CR includes:

a cognitive base station configured to determine a candidate operating frequency point for a UE deployed in the cognitive frequency band, to transmit broadcast information carrying at least the candidate operating frequency point to the UE and to instruct the UE in a frequency point switching command to switch from a currently used operating frequency point to the candidate operating frequency point; and the UE, deployed in the cognitive frequency band, configured to receive the broadcast information, transmitted from the cognitive base station, carrying at least the candidate operating frequency point and to switch from the currently used operating frequency point to the candidate operating frequency point upon reception of the frequency point switching command transmitted from the cognitive base station.

In the embodiments of the invention, when a mobile communication system is deployed in a cognitive frequency band, a cognitive base station transmits a candidate operating frequency point required for frequency point switching and other relevant information to a UE in a broadcast manner over a newly defined broadcast channel or in newly defined broadcast information and instructs the UE in a frequency point switching command to switch from a currently used operating frequency point to the candidate operating frequency point, so that the UE deployed in the cognitive frequency band can switch the frequency point rapidly and accurately in response to the instruction of the cognitive base station when an incumbent user accesses the operating frequency point currently used by the UE to avoid interference to the incumbent user effectively to thereby ensure both service performance and service continuity of the system.

DETAILED DESCRIPTION OF THE EMBODIMENTS

In order to avoid interference of a UE to an incumbent user in a cognitive frequency band when a mobile communication system is deployed in a cognitive frequency band, a base station using a CR technology (hereinafter a cognitive base station) shall instruct the UE to quit rapidly a currently used operating frequency point and switch the UE to a new operating frequency point when the incumbent user is present at the operating frequency point currently used by the UE in embodiments of the invention, particularly as follows:

The cognitive base station determines a candidate operating frequency point for the UE deployed in the cognitive frequency band, and next transmits broadcast information carrying at least the candidate operating frequency point to the UE and instructs the UE in a frequency point switching command to switch from the currently used operating frequency point to the candidate operating frequency point, where the UE deployed in the cognitive frequency band is particularly a UE at a operating frequency point deployed in the cognitive frequency band. In an embodiment of the invention, the frequency point switching command can be present in the broadcast information or separately as introduced in the following embodiment.

Correspondingly the UE deployed in the cognitive frequency band switches from the currently used operating frequency point to the candidate operating frequency point upon reception of the frequency point switching common transmitted from the cognitive base station, after the UE has received the broadcast information, transmitted from the cognitive base station, carrying at least the candidate operating frequency point.

The candidate operating frequency point can be a frequency point selected in the cognitive frequency band or a frequency point selected in a non-cognitive frequency band, and here the operating frequency band of the candidate operating frequency point will not be defined so long as the UE can quit rapidly the operating frequency point currently used by the UE in the cognitive frequency band while avoiding interference to the incumbent user.

Preferred embodiments of the invention will be described below in details with reference to the drawings.

Figure 1:
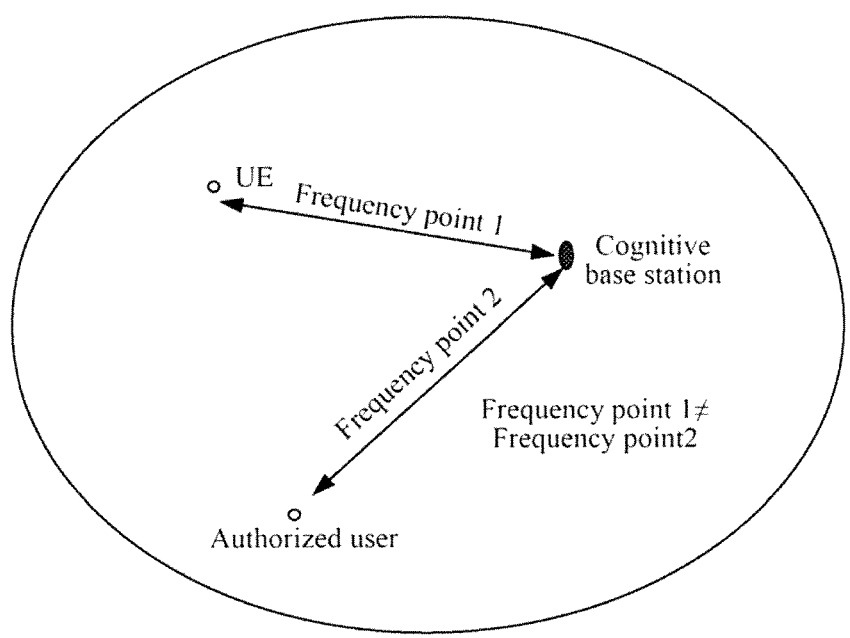
FIG. 1 is an architectural diagram of a mobile communication system deployed in a cognitive frequency band in an embodiment of the invention.

Referring to FIG. 1, a mobile communication system deployed in a cognitive frequency band in an embodiment of the invention includes a cognitive base station and a UE, where:

The cognitive base station is configured to determine a candidate operating frequency point for the UE deployed in the cognitive frequency band, to transmit broadcast information carrying at least the candidate operating frequency point to the UE and to instruct the UE in a frequency point switching command to switch from a currently used operating frequency point to the candidate operating frequency point; and The UE deployed in the cognitive frequency band is configured to receive the broadcast information, transmitted from the cognitive base station, carrying at least the candidate operating frequency point and to switch from the currently used operating frequency point to the candidate operating frequency point upon reception of the frequency point switching command transmitted from the cognitive base station.

Figure 2:
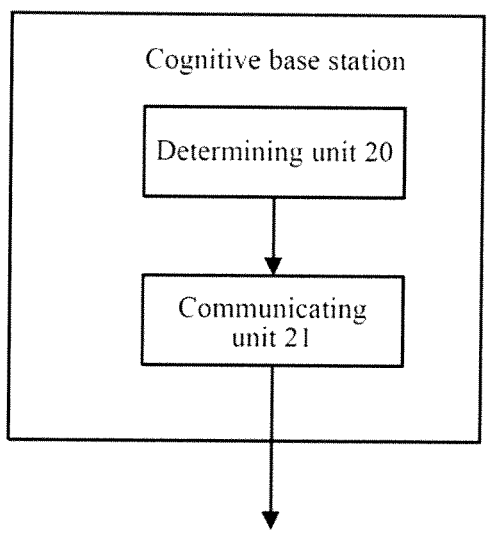
FIG. 2 is a functionally structural diagram of a cognitive base station in an embodiment of the invention.

Referring to FIG. 2, a cognitive base station in an embodiment of the invention includes a determining unit 20 and a communicating unit 21, where:

The determining unit 20 is configured to determine a candidate operating frequency point for a UE deployed in the cognitive frequency band; and The communicating unit 21 is configured to transmit broadcast information carrying at least the candidate operating frequency point to the UE and to instruct the UE in a frequency point switching command to switch from a currently used operating frequency point to the candidate operating frequency point.

Figure 3:
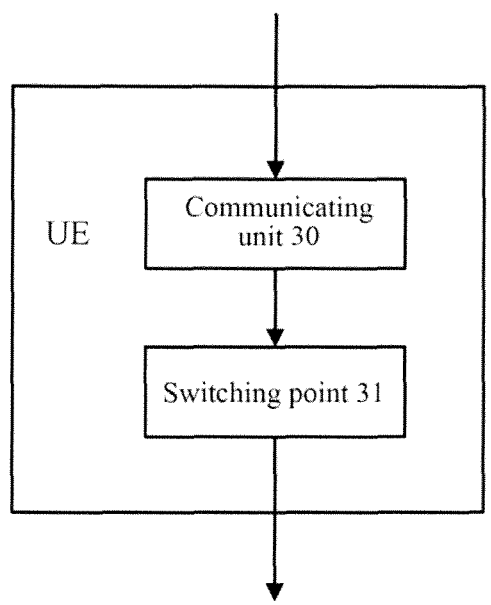
FIG. 3 is a functionally structural diagram of a UE in an embodiment of the invention.

Referring to FIG. 3, a UE in an embodiment of the invention includes a communicating unit 30 and a switching unit 31, where:

The communicating unit 30 is configured to receive, in a cognitive frequency band, broadcast information, transmitted from a cognitive base station, carrying at least a candidate operating frequency point; and The switching unit 31 is configured to switch from a currently used operating frequency point to the candidate operating frequency point upon reception of a frequency point switching command transmitted from the cognitive base station.

Figure 4:
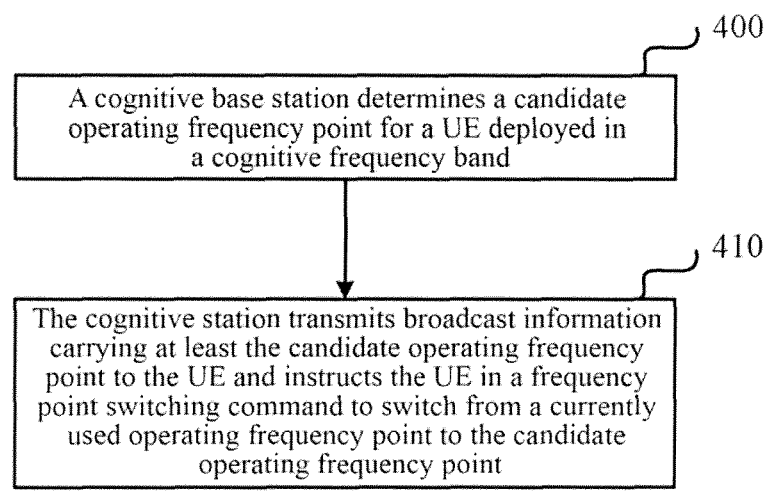
FIG. 4 is a flow chart of a cognitive base station instructing a UE to switch a cell in an embodiment of the invention.

Referring to FIG. 4, a cognitive base station instructs a UE to perform a cell switch in an embodiment of the invention in the following flow:

Step 400: A cognitive base station determines a candidate operating frequency point for a UE deployed in a cognitive frequency band.

In a practical application, the cognitive base station maintains a preset list of available frequency points and checks whether the available frequency points included in the list for availability sequentially are available in a specified order of priorities, where an available frequency point can be located in the cognitive frequency band or a non-cognitive frequency band. In an embodiment of the invention, the cognitive base station can perform the step 400 by selecting one frequency point from the locally maintained list of available frequency points as a candidate operating frequency point or selecting a plurality of frequency points from the locally maintained list of available frequency points as candidate operating frequency points, and preferably, the cognitive base station can transmit the list of available frequency points to the UE.

Step 410: The cognitive base station transmits broadcast information (e.g., radio resource control signaling) carrying at least the candidate operating frequency point to the UE and instructs the UE in a frequency point switching command to switch from a currently used operating frequency point to the candidate operating frequency point.

Since a general object of the invention is to ensure rapid and accurate frequency point switching when an incumbent user accesses an operating frequency point currently used by a UE to thereby avoid interference to the incumbent user, the cognitive base station instructs the UE in the frequency point switching command to switch from the currently used operating frequency point to the candidate operating frequency point particularly upon determining the presence of an accessing incumbent user at the operating frequency point currently used by the UE.

In a practical application, in order to ensure that the UE can switch accurately in time to the candidate operating frequency point upon reception of the frequency point switching command, the cognitive base station shall transmit the broadcast information carrying some new signaling contents to the UE, wherein typically the cognitive base station shall notify the UE of the candidate operating frequency point. Of course, other frequency point switch information can be further included, e.g., bandwidth information at the candidate operating frequency point, time and frequency synchronization information, random access configuration information (e.g., random access resource location information, random access preamble sequence information, etc.) etc.; and in order to ensure communication continuity, the cognitive base station can even also transmit resource scheduling information on the candidate operating frequency point to the UE in the broadcast information to thereby ensure that the UE can continue communication with the cognitive base station after switching from the currently used operating frequency point to the candidate operating frequency point. Of course, if the cognitive base station transmits a plurality of candidate operating frequency points to the UE, then the base station shall further transmit frequency point switch information, e.g., bandwidth information, time and frequency synchronization information, random access configuration information, etc., corresponding to each candidate operating frequency point to the UE in the broadcast information for selection by the UE, and a repeated description thereof will be omitted here.

In this embodiment, the cognitive base station performs the step 410 in the following two implementations but will not be limited thereto:

In a first implementation, the cognitive base station performs spectrum detection on the cognitive frequency band used by the UE to obtain a spectrum detection result, and upon determining, from the spectrum detection result, the presence of the accessing incumbent user at the operating frequency point currently used by the UE, transmits the broadcast information carrying at least the candidate operating frequency point to the UE and instructs the UE in the frequency point switching command carried in the broadcast information to switch from the currently used operating frequency point to the candidate operating frequency point.

In the first implementation, the cognitive base station can perform spectrum detection on the cognitive frequency band before determining the candidate operating frequency point of the UE, during determination of the candidate operating frequency point of the UE or after determining the candidate operating frequency point of the UE. The cognitive base station can perform spectrum detection on the cognitive frequency band typically by checking whether a characterizing signal of the incumbent user is presence at the operating frequency point currently used by the UE. When a mobile communication system is deployed in a TV frequency band, for example, the cognitive base station determines an initiated access of the incumbent user upon detecting initiated transmission of a broadcast television signal at the operating frequency point currently used by the UE.

Upon determining the initiated access of the incumbent user, the cognitive base station notifies the UE of the broadcast information carrying at least the candidate operating frequency point over a newly defined broadcast channel and transmits the frequency point switching command to the UE to instruct the UE to read the broadcast information over the broadcast channel and to initiate performance of a frequency point switching flow. Particularly if the cognitive base station carries one candidate operating frequency point in the broadcast information, then the base station instructs the UE to establish a target cell at the candidate operating frequency point and to switch from a source cell established at the currently used operating frequency point to the target cell; and if the cognitive base station carries a plurality of candidate operating frequency points in the broadcast information, then the base station instructs the UE to select one of the plurality of candidate operating frequency points, to establish a target cell at the candidate operating frequency point and to switch from a source cell established at the currently used operating frequency point to the target cell.

The cognitive base station can transmit the broadcast information to the UE in the first implementation to thereby ensure correct reception of the broadcast information by the UE due to reliable information over the newly defined broadcast channel and to enable the UE to switch rapidly to the candidate operating frequency point upon reception of the frequency point switching command to effectively avoid interference to the incumbent user. For example, the cognitive base station transmits the broadcast information in 10 ms, that is, transmits the broadcast information over the newly defined broadcast channel, upon determining the access of the incumbent user to the operating frequency point currently used by the UE to thereby finish transmission of the broadcast information in a short period of time to ensure rapid performance of the frequency point switching point.

Following the foregoing embodiment, since the access of the incumbent user may pose strong interference to signal reception of the UE, the cognitive base station can further retransmit the broadcast information at a preset period of time (e.g., a period of time T=40 ms) in order to ensure correct reception of the broadcast information by the UE, and upon completion of transmission, terminate data transmission at the operating frequency point currently used by the UE and switch to the candidate operating frequency point used by the UE for data transmission. In order to enable the UE to resume communication with the cognitive base station rapidly, the cognitive base station can further carry resource scheduling information used by the UE at the candidate operating frequency point in the broadcast information transmitted to the UE and instruct the UE to communicate with the cognitive base station based on the resource scheduling information upon completed performance of the frequency point switching flow.

In a second implementation, after transmitting the broadcast information to the UE, the cognitive base station performs spectrum detection on the cognitive frequency band used by the UE to obtain a spectrum detection result, and upon determining, from the spectrum detection result, the presence of the accessing incumbent user at the operating frequency point currently used by the UE, transmits the frequency point switching command to the UE to instruct the UE to switch from the currently used operating frequency point to the candidate operating frequency point.

In the second implementation, the cognitive base station pre-transmits the broadcast information carrying at least the candidate operating frequency point to the UE, and in this implementation, new broadcast contents shall be added to existing broadcast information and broadcasted over an existing broadcast channel, and this will achieve higher reliability at the cost of significant modification to the existing signaling and relevant flow because incorrect reception of the broadcast information by the UE due to strong interference of the incumbent user can be avoided effectively. For example, the cognitive base station can retransmit the broadcast information four times at a period of time of 40 ms, and after reading the broadcast information, the UE can switch the frequency point directly upon reception of the frequency point switching command transmitted from the cognitive base station without further reading the contents over the broadcast channel to thereby improve the efficiency of switching the frequency point.

Upon completed transmission of the broadcast information, the cognitive base station initiates detection on the cognitive frequency band used by the UE, and as in the first implementation, the cognitive base station performs spectrum detection on the cognitive frequency band typically by checking the operating frequency point currently used by the UE for a characterizing signal of the incumbent user. When a mobile communication system is deployed in a TV frequency band, for example, the cognitive base station determines an initiated access of the incumbent user upon detecting initiated transmission of a broadcast television signal at the operating frequency point currently used by the UE.

Upon determining the initiated access of the incumbent user, the cognitive base station transmits the frequency point switching command to the UE to instruct the UE to initiate performance of a frequency point switching flow. Particularly if the cognitive base station carries one candidate operating frequency point in the broadcast information, then the base station instructs the UE in the frequency point switching command to establish a target cell at the candidate operating frequency point and to switch from a source cell established at the currently used operating frequency point to the target cell; and if the cognitive base station carries a plurality of candidate operating frequency points in the broadcast information, then the base station instructs the UE in the frequency point switching command to select one of the plurality of candidate operating frequency points, to establish a target cell at the candidate operating frequency point and to switch from a source cell established at the currently used operating frequency point to the target cell.

The cognitive base station transmits the broadcast information to the UE and notifies the UE of the relevant contents over the existing broadcast channel in the second implementation, and at present the cognitive base station can finish transmission of the broadcast information in 10 ms and retransmit the broadcast information at a 40 ms period of time to thereby ensure that all of users under different channel conditions can detect correctly the broadcast information.

Following the foregoing embodiment, the cognitive base station terminates data transmission at the operating frequency point currently used by the UE after waiting for a preset period of time (e.g., a period of time T'=100 ms) subsequent to finished transmission of the frequency point switching command and switches to the candidate operating frequency point used by the UE for data transmission. T' is preset empirically by an operator and can neither be too long nor be too short in that too long T' may result in influence to the incumbent user and too short T' may result in insufficient preparation of the cognitive base station itself. Preferably T' preset to approximately 100 ms can avoid influence to the incumbent user in time but also provide the cognitive base station with a period of time sufficient to prepare for data transmission and reception at the new candidate operating frequency point. In order to enable the UE to resume communication with the cognitive base station rapidly, the cognitive base station can further carry resource scheduling information used by the UE at the candidate operating frequency point in the broadcast information transmitted to the UE and instruct the UE to communicate with the cognitive base station based on the resource scheduling information upon completed performance of the frequency point switching flow.

Figure 5:
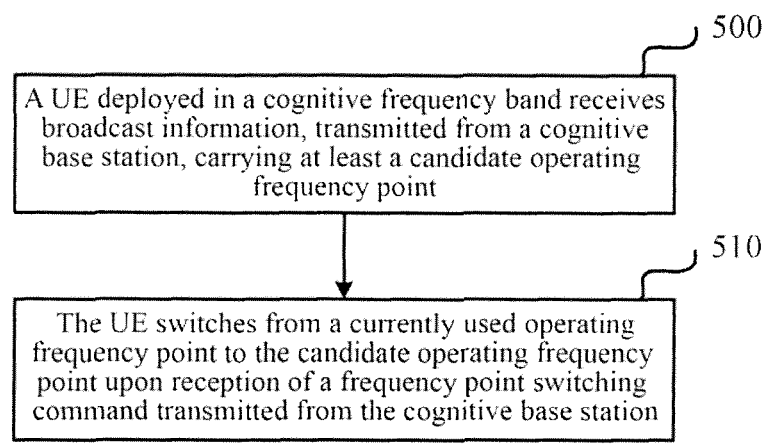
FIG. 5 is a flow chart of a UE switching a cell in response to an instruction of a cognitive base station in an embodiment of the invention.

In correspondence to the foregoing embodiments, referring to FIG. 5, a UE switches a frequency point in response to an instruction of a cognitive base station in an embodiment of the invention in the following detailed flow:

Step 500: A UE deployed in a cognitive frequency band receives broadcast information, transmitted from a cognitive base station, carrying at least a candidate operating frequency point.

Step 510: The UE switches from a currently used operating frequency point to the candidate operating frequency point upon reception of a frequency point switching command transmitted from the cognitive base station.

In an embodiment of the invention, if the cognitive base station transmits the broadcast information in the first implementation, then the UE reads information contents relevant to frequency point switching from the broadcast information and performs a frequency point switch flow according to the frequency point switching command present in the broadcast information upon reception of the broadcast information.

If the cognitive base station transmits the broadcast information in the second implementation, then the UE pre-reads information contents relevant to frequency point switching from the broadcast information transmitted from the cognitive base station and initiates a frequency point switch flow upon reception of the separate frequency point switching command transmitted from the cognitive base station.

In an embodiment of the invention, when the step 510 is performed,

If the UE receives one candidate operating frequency point transmitted from the cognitive base station, then the UE establishes a target cell at the candidate operating frequency point and switches from a source cell established at the currently used operating frequency point to the target cell; and If the UE receives a plurality of candidate operating frequency points transmitted from the cognitive base station, then the UE selects one of the plurality of candidate operating frequency points, establishes a target cell at the candidate operating frequency point and to switch from a source cell established at the currently used operating frequency point to the target cell. For example, the UE selects a candidate operating frequency point for establishing a target cell sequentially in an order of priorities corresponding to the obtained plurality of candidate operating frequency points until a target cell is established successfully and then switches from a source cell established at the currently used operating frequency point to the target cell. Particularly each time a candidate operating frequency point is selected, if the UE establishes a target cell successfully at the candidate operating frequency point, then no further candidate operating frequency point will be used; and if no target cell can be established successfully at the selected candidate operating frequency point due to a network environment problem (e.g., an access of an incumbent user, interfering noise, etc.), then the UE further selects one among the obtained remaining candidate operating frequency points for establishing a target cell until a success thereof, and so on, a repeated description of which will be omitted here. Upon terminated data transmission at the operating frequency point currently used by the UE, the cognitive base station can perform detection by itself to determine which candidate operating frequency point the UE has selected and thereby switch to the candidate operating frequency point for communication with the UE. In order to enable the UE to resume communication with the cognitive base station rapidly, the cognitive base station can further carry resource scheduling information used by the UE at the candidate operating frequency point in the broadcast information transmitted to the UE and instruct the UE to communicate with the cognitive base station based on the resource scheduling information upon completion of the frequency point switching flow.

Preferably the technical solutions according to the embodiments of the invention can be applicable to an LTE system but also to other mobile communication systems and user equipments operating in a cognitive frequency band, e.g., a Time Division-Synchronous Code Division Multiple Access (TD-SCDMA) system, a Worldwide Interoperability for Microwave Access (WiMAX) system, a Code Division Multiple Access 2000 (CDMA2000) system, a Wideband Code Division Multiple Access (WCDMA) system, a Global System of Mobile Communication (GSM) system, etc., so long as the flow is modified as appropriate dependent upon a practical application context, and a repeated description thereof will be omitted here.

In the embodiments of the invention, when a mobile communication system is deployed in a cognitive frequency band, a cognitive base station transmits a candidate operating frequency point required for frequency point switching and other relevant information to a UE in a broadcast manner over a newly defined broadcast channel or in newly defined broadcast information and instructs the UE in a frequency point switching command to switch from a currently used operating frequency point to the candidate operating frequency point, so that the UE deployed in the cognitive frequency band can switch the frequency point rapidly and accurately in response to the instruction of the cognitive base station when an incumbent user accesses the operating frequency point currently used by the UE to avoid interference to the incumbent user effectively to thereby ensure both service performance and service continuity of the system.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for implementing frequency point switch based on Cognitive Radio, CR, comprising:
determining, by a cognitive base station, a candidate operating frequency point for a User Equipment, UE, deployed in a cognitive frequency band; and
transmitting, by the cognitive base station, broadcast information carrying at least the candidate operating frequency point to the UE and instructing the UE in a frequency point switching command to switch from a currently used operating frequency point to the candidate operating frequency point;
wherein determining, by the cognitive base station, a candidate operating frequency point for the UE deployed in the cognitive frequency band comprises:
selecting one frequency point from a locally maintained list of available frequency points as a candidate operating frequency point; or
selecting a plurality of frequency points from a locally maintained list of available frequency points as candidate operating frequency points, and
wherein instructing, by the cognitive base station, the UE in the frequency point switching command to switch from the currently used operating frequency point to the candidate operating frequency point comprises:
if one candidate operating frequency point is transmitted to the UE, then instructing the UE to establish a target cell at the candidate operating frequency point and to switch from a source cell established at the currently used operating frequency point to the target cell; and
if a plurality of candidate operating frequency points are transmitted to the UE, then instructing the UE to select one of the candidate operating frequency points, to establish a target cell at the candidate operating frequency point and to switch from a source cell established at the currently used operating frequency point to the target cell.

2. The method according to claim 1, wherein the cognitive base station instructs the UE in the frequency point switching command to switch from the currently used operating frequency point to the candidate operating frequency point particularly upon determining the presence of an accessing incumbent user at the operating frequency point currently used by the UE.

3. The method according to claim 2, wherein transmitting, by the cognitive base station, the broadcast information carrying at least the candidate operating frequency point to the UE and instructing the UE in the frequency point switching command to switch from the currently used operating frequency point to the candidate operating frequency point comprises:
performing spectrum detection on the cognitive frequency band used by the UE to obtain a spectrum detection result; and
upon determining, from the spectrum detection result, the presence of an accessing incumbent user at the operating frequency point currently used by the UE, transmitting the broadcast information carrying at least the candidate operating frequency point to the UE and instructing the UE in the frequency point switching command carried in the broadcast information to switch from the currently used operating frequency point to the candidate operating frequency point.

4. The method according to claim 3, wherein the cognitive base station retransmits the broadcast information at a preset period of time, and upon completion of transmission, terminates data transmission at the operating frequency point currently used by the UE and switches to the candidate operating frequency point for data transmission.

5. The method according to claim 2, wherein transmitting, by the cognitive base station, the broadcast information carrying at least the candidate operating frequency point to the UE and instructing the UE in the frequency point switching command to switch from the currently used operating frequency point to the candidate operating frequency point comprises:
transmitting the broadcast information carrying at least the candidate operating frequency point to the UE;
performing spectrum detection on the cognitive frequency band used by the UE to obtain a spectrum detection result; and
upon determining from the spectrum detection result the presence of an accessing incumbent user at the operating frequency point currently used by the UE, transmitting the frequency point switching command to the UE to instruct the UE to switch from the currently used operating frequency point to the candidate operating frequency point.

6. The method according to claim 5, wherein after the cognitive base station transmits the frequency point switching command and then waits for a preset time period, the cognitive base station terminates data transmission at the operating frequency point currently used by the UE and switches to the candidate operating frequency for data transmission.

7. The method according to claim 1, wherein the cognitive base station furthers carries resource scheduling information used by the UE at the candidate operating frequency point in the broadcast information and instructs the UE to communicate with the cognitive base station based on the resource scheduling information upon completion of a frequency point switching flow.

8. A method for implementing frequency point switch based on Cognitive Radio, CR, comprising:
receiving, by a User Equipment, UE, deployed in a cognitive frequency band, broadcast information, transmitted from a cognitive base station, carrying at least a candidate operating frequency point; and
switching, by the UE, from a currently used operating frequency point to the candidate operating frequency point upon reception of a frequency point switching command transmitted from the cognitive base station;
wherein if the UE receives a plurality of candidate operating frequency points transmitted from the cognitive base station, then the switching, by the UE, from the currently used operating frequency point to the candidate operating frequency point comprises:
selecting, by the UE, a candidate operating frequency point for establishing a target cell sequentially in an order of priorities corresponding to the plurality of candidate operating frequency points until a target cell is established successfully and then switching from a source cell established at the currently used operating frequency point to the target cell.

9. The method according to claim 8, wherein switching, by the UE, from the currently used operating frequency point to the candidate operating frequency point upon reception of the frequency point switching command transmitted from the cognitive base station comprises:
establishing, by the UE, a target cell at the candidate operating frequency point and switching from a source cell established at the currently used operating frequency point to the target cell if the UE receives one candidate operating frequency point transmitted from the cognitive base station; and
selecting, by the UE, one of a plurality of candidate operating frequency points, establishing a target cell at the candidate operating frequency point and switching from a source cell established at the currently used operating frequency point to the target cell if the UE receives the plurality of candidate operating frequency points transmitted from the cognitive base station.

10. The method according to claim 8, wherein the UE further obtains resource scheduling information used by the UE at the candidate operating frequency point in the broadcast information and communicates with the cognitive base station based on the resource scheduling information upon completion of a frequency point switching flow.

11. An apparatus for implementing frequency point switch based on Cognitive Radio, CR, comprising:
a determining unit configured to determine a candidate operating frequency point for a User Equipment, UE, deployed in the cognitive frequency band; and
a communicating unit configured to transmit broadcast information carrying at least the candidate operating frequency point to the UE and to instruct the UE in a frequency point switching command to switch from a currently used operating frequency point to the candidate operating frequency point;
wherein the determining unit determining a candidate operating frequency point for the UE deployed in the cognitive frequency band comprises:
selecting one frequency point from a locally maintained list of available frequency points as a candidate operating frequency point; or
selecting a plurality of frequency points from a locally maintained list of available frequency points as candidate operating frequency points, and
wherein the communicating unit instructing the UE in the frequency point switching command to switch from the currently used operating frequency point to the candidate operating frequency point comprises:
if one candidate operating frequency point is transmitted to the UE, then instructing the UE to establish a target cell at the candidate operating frequency point and to switch from a source cell established at the currently used operating frequency point to the target cell; and
if a plurality of candidate operating frequency points are transmitted to the UE, then instructing the UE to select one of the candidate operating frequency points, to establish a target cell at the candidate operating frequency point and to switch from a source cell established at the currently used operating frequency point to the target cell.

12. The apparatus according to claim 11, wherein the determining unit instructs the UE in the frequency point switching command to switch from the currently used operating frequency point to the candidate operating frequency point upon determining the presence of an accessing incumbent user at the operating frequency point currently used by the UE.

13. The apparatus according to claim 12, further comprising:
a detecting unit configured to perform spectrum detection on the cognitive frequency band used by the UE to obtain a spectrum detection result; and
wherein after the detecting unit performs spectrum detection, the communicating unit, upon determining, from the spectrum detection result, the presence of an accessing incumbent user at the operating frequency point currently used by the UE, transmits the broadcast information carrying at least the candidate operating frequency point to the UE and instructs the UE in the frequency point switching command carried in the broadcast information to switch from the currently used operating frequency point to the candidate operating frequency point.

14. The apparatus according to claim 13, wherein the communicating unit retransmits the broadcast information at a preset period of time, and upon completion of transmission, terminates data transmission at the operating frequency point currently used by the UE and switches to the candidate operating frequency point for data transmission.

15. The apparatus according to claim 12, further comprising:
a detecting unit configured to perform spectrum detection on the cognitive frequency band used by the UE to obtain a spectrum detection result; wherein
the detecting unit performs spectrum detection after the communicating unit transmits the broadcast information to the UE, and upon determining, from the spectrum detection result, the presence of an accessing incumbent user at the operating frequency point currently used by the UE, the communicating unit transmits the frequency point switching command to the UE to instruct the UE to switch from the currently used operating frequency point to the candidate operating frequency point.

16. An apparatus for implementing frequency point switch based on Cognitive Radio, CR, comprising:
a communicating unit configured to receive, in a cognitive frequency band, broadcast information, transmitted from a cognitive base station, carrying at least a candidate operating frequency point; and a switching unit configured to switch from a currently used operating frequency point to the candidate operating frequency point upon reception of a frequency point switching command transmitted from the cognitive base station;

wherein if the switching unit receives a plurality of candidate operating frequency points transmitted from the cognitive base station, then the switching unit is configured to select a candidate operating frequency point for establishing a target cell sequentially in an order of priorities corresponding to the plurality of candidate operating frequency points until a target cell is established successfully and then to switch from a source cell established at the currently used operating frequency point to the target cell.

17. The apparatus according to claim 16, wherein the switching unit switching from the currently used operating frequency point to the candidate operating frequency point upon reception of the frequency point switching command transmitted from the cognitive base station comprises:

if the switching unit receives one candidate operating frequency point transmitted from the cognitive base station, then establishing a target cell at the candidate operating frequency point and switching from a source cell established at the currently used operating frequency point to the target cell; and if the switching unit receives a plurality of candidate operating frequency points transmitted from the cognitive base station, then selecting one of the candidate operating frequency points, establishing a target cell at the candidate operating frequency point and switching from a source cell established at the currently used operating frequency point to the target cell.

* * * * *